(12) United States Patent
Venkataraghavan

(10) Patent No.: US 12,490,184 B2
(45) Date of Patent: Dec. 2, 2025

(54) SYSTEM, METHOD, AND COMPUTER PROGRAM FOR OPTIMAL ACCESS DETERMINATION

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/005,705

(22) PCT Filed: Nov. 29, 2022

(86) PCT No.: PCT/US2022/051199
§ 371 (c)(1),
(2) Date: Jan. 17, 2023

(87) PCT Pub. No.: WO2024/118054
PCT Pub. Date: Jun. 6, 2024

(65) Prior Publication Data
US 2025/0097835 A1    Mar. 20, 2025

(51) Int. Cl.
*H04W 4/00* (2018.01)
*H04W 48/16* (2009.01)
*H04W 48/20* (2009.01)

(52) U.S. Cl.
CPC .......... *H04W 48/20* (2013.01); *H04W 48/16* (2013.01)

(58) Field of Classification Search
CPC .............................. H04W 48/16; H04W 48/20
USPC .......................................................... 455/434
See application file for complete search history.

(56) References Cited

U.S. PATENT DOCUMENTS

| 2009/0137249 | A1* | 5/2009 | Horn ................ H04W 36/0085 455/435.2 |
| 2014/0086212 | A1* | 3/2014 | Kafle ................... H04B 17/345 370/329 |
| 2015/0110087 | A1* | 4/2015 | Salkintzis ............. H04W 48/20 370/338 |
| 2018/0041944 | A1* | 2/2018 | Korneluk .............. H04W 4/029 |
| 2018/0332442 | A1* | 11/2018 | Shaw ..................... H04W 36/06 |
| 2020/0120458 | A1* | 4/2020 | Aldana ................. H04W 28/22 |
| 2022/0150820 | A1* | 5/2022 | Newman ............... H04W 48/20 |

OTHER PUBLICATIONS

International Search Report issued Apr. 11, 2023, in Application No. PCT/US2022/051199.
Written Opinion issued Apr. 11, 2023, in Application No. PCT/US2022/051199.

* cited by examiner

*Primary Examiner* — Temica M Beamer
(74) *Attorney, Agent, or Firm* — Sughrue Mion, PLLC

(57) ABSTRACT

Provided are system, method, and device for optimal access determination. The system including: a first node including: a memory storing instructions; and at least one processor configured to execute the instructions to: determine whether or not multiple access points (APs) are available; based on determining that the multiple APs are available, determine a type of each of the multiple APs; and based on the determined type of each of the multiple APs, determine an optimal AP from among the multiple APs.

20 Claims, 10 Drawing Sheets

| Subscriber ID | Subscription Profile ID | Subscription Type | Service Metric | Service Type |
|---|---|---|---|---|
| 1 | A | Type Y | GBR: X1 Kbps | Service 1 |
| 1 | A | Type Y | GBR: X2 Kbps | Application 1 |
| 2 | B | Type Z | GBR: X3 Mbps | Service 2 |
| ... | ... | ... | ... | ... |
| N | N | N | GBR: N kbps | Application N |

FIG. 3

| Session Type | CGI | Tech | Deployment | Quality Indicator |
|---|---|---|---|---|
| Voice | LTE_ECGI NSA_ECGI SA_ECGI | LTE 5G NSA 5G SA | LTE NSA_Sub6 NSA_mmW SA | X |
| Data | LTE_ECGI NSA_ECGI SA_ECGI | LTE 5G NSA 5G SA | LTE NSA_Sub6 NSA_mmW SA | Y |
| ... | ... | ... | ... | ... |
| Type N | CGI N | Tech N | Deployment N | Z |

FIG. 4

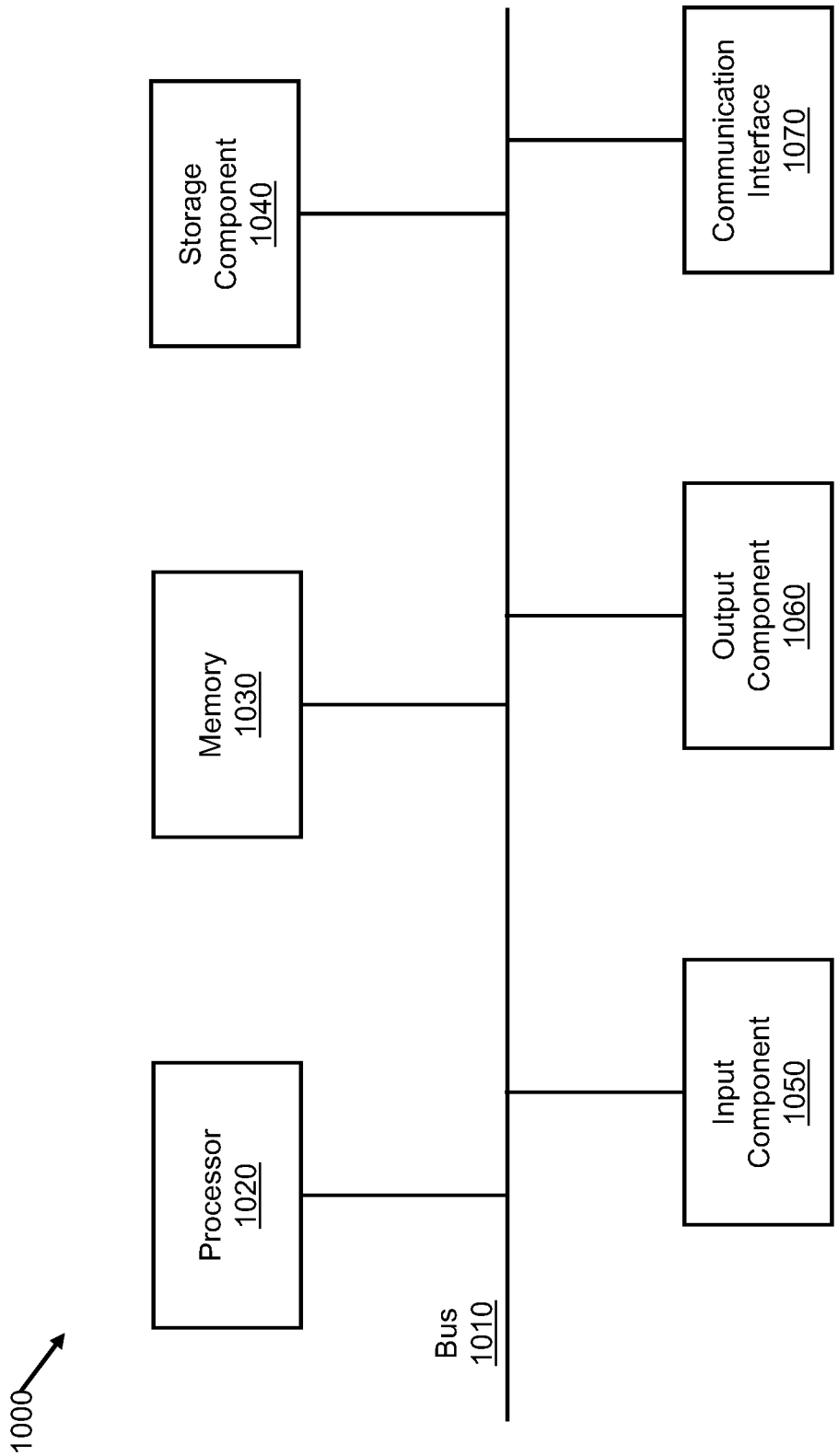

SYSTEM, METHOD, AND COMPUTER PROGRAM FOR OPTIMAL ACCESS DETERMINATION

CROSS REFERENCE TO RELATED APPLICATIONS

This application is a National Stage of International Application No. PCT/US2022/051199 filed on Nov. 29, 2022.

1. FIELD

Systems and methods consistent with example embodiments of the present disclosure relate to determination of an optimal access and, more particularly, relate to systems and methods for determining an optimal access point in a multichannel network.

2. DESCRIPTION OF RELATED ART

In the related art, a user equipment (UE) may have the mobility to access one or more networks via a plurality of access channels, such as 3rd Generation Partnership Project (3GPP) access channels and non-3GPP access channels. Nevertheless, the selection of an access point (AP) for accessing the network via the respective access channel in the related art may not be optimal and may impair user experience.

Specifically, in the related art, the user may need to manually select an AP for a desired access channel, or may allow the UE to automatically select the AP on his behalf. The former approach may require the user to have good understanding and prerequisite knowledge on the UE and each of the available APs, in order for the user to configure the UE to select an appropriate AP. On the other hand, although the latter approach may allow the UE to automatically select an AP for the user, the selection of the AP is based on static configuration and criteria predefined by vendor of the UE and/or the network operator.

Accordingly, in the related art, the selection of an AP may not be optimal, since the selection of the AP is not based on the status (e.g., quality, performance, etc.) of the associated access channel as well as the nature of service(s) or application(s) the user is utilizing via the access channel and the service performance demand. Thus, in the related art, it may be challenging to provide a stable channel quality or performance and to provide guaranteed service quality.

SUMMARY

According to embodiments, systems methods, and devices are provided for automatically and dynamically determining an optimal AP based on real-time or near real-time status. Further, example embodiments of the present disclosures also provide systems and methods for automatically and dynamically updating one or more channel quality metrics. Furthermore, example embodiments of the present disclosures also provide systems and methods for automatically determining and performing one or more mitigation actions to mitigate the issue(s) or error(s) inhibiting the channel performance or quality after the node is connected to the access channel via a selected AP. Accordingly, example embodiments of the present disclosures allow the network operator and/or service providers to provide services with guaranteed service performance and fulfill the dynamic nature of user demand on service performance, thereby improve user experiences.

According to embodiments, a system includes: a first node including: a memory storing instructions; and at least one processor configured to execute the instructions to: determine whether or not multiple access points (APs) are available; based on determining that the multiple APs are available, determine a type of each of the multiple APs; and based on the determined type of each of the multiple APs, determine an optimal AP from among the multiple APs.

The first node may include a user equipment (UE). The type of each of the multiple APs may include: an AP associated with a 3rd Generation Partnership Project (3GPP) access channel; an AP associated with a trusted non-3GPP access channel; and an AP associated with for a untrusted non-3GPP access channel.

The at least one processor of the first node may be configured to execute the instructions to determine whether or not the multiple APs are available by scanning for APs within a coverage area.

The at least one processor of the first node may be configured to execute the instructions to determine the optimal AP by: evaluating, based on a predefined policy, a first AP of the multiple APs; based on determining that one or more conditions defined by the predefined policy is met, determining the first AP as the optimal AP; based on determining that the one or more conditions defined by the predefined policy is not met, evaluating, based on a channel quality metric defining a channel quality of the 3GPP access channel and a service metric defining a minimum service performance requirement, a second AP of the multiple APs; based on determining that the channel quality defined by the channel quality metric fulfills or exceeds the minimum service performance requirement defined by the service metric, determining the second AP as the optimal AP; and based on determining that the channel quality defined by the channel quality metric does not fulfill the minimum service performance requirement defined by the service metric, determining a third AP of the multiple APs as the optimal AP.

The first AP may include the AP associated with the trusted non-3GPP access channel, the second AP may include the AP associated with the 3GPP access channel, and the third AP may include the AP associated with the untrusted non-3GPP access channel.

The system may further include: a second node including: a memory storing instructions; and at least one processor configured to execute the instructions to: based on determining that the first node is connected to the 3GPP access channel, obtain service information associated with a service utilized by the first node via the 3GPP access channel; determine whether or not a condition for performing a service evaluation is met; based on determining that the condition for performing the service evaluation is met, evaluate a service performance of the service; determine whether or not a condition for performing a mitigation action is met; and based on determining that the condition for performing the mitigation action is met, output information for performing the mitigation action.

The system may further include: a third node including: a memory storing instructions; and at least one processor configured to execute the instructions to: receive the information for performing the mitigation action from the second node; determine an unmet service performance requirement from the received information; determine one or more mitigation actions associated with the unmet service performance requirement; and perform the determined one or more mitigation actions.

According to embodiments, a method includes: determining, by at least one processor of a first node, whether or not multiple access points (APs) are available; based on determining that the multiple APs are available, determining, by the at least one processor of the first node, a type of each of the multiple APs; and based on the determined type of each of the multiple APs, determining, by the at least one processor of the first node, an optimal AP from among the multiple APs.

The first node may include a user equipment (UE). The type of each of the multiple APs may include: an AP associated with a 3rd Generation Partnership Project (3GPP) access channel; an AP associated with a trusted non-3GPP access channel; and an AP associated with for a untrusted non-3GPP access channel.

The determining of whether or not the multiple APs are available may include scanning for APs within a coverage area.

The determining of the optimal AP may include: evaluating, based on a predefined policy, a first AP of the multiple APs; based on determining that one or more conditions defined by the predefined policy is met, determining the first AP as the optimal AP; based on determining that the one or more conditions defined by the predefined policy is not met, evaluating, based on a channel quality metric defining a channel quality of the 3GPP access channel and a service metric defining a minimum service performance requirement, a second AP of the multiple APs; based on determining that the channel quality defined by the channel quality metric fulfills or exceeds the minimum service performance requirement defined by the service metric, determining the second AP as the optimal AP; and based on determining that the channel quality defined by the channel quality metric does not fulfill the minimum service performance requirement defined by the service metric, determining a third AP of the multiple APs as the optimal AP.

The first AP may include the AP associated with the trusted non-3GPP access channel, the second AP may include the AP associated with the 3GPP access channel, and the third AP may include the AP associated with the untrusted non-3GPP access channel.

The method may further include: based on determining that the first node is connected to the 3GPP access channel, obtaining, by at least one processor of a second node, service information associated with a service utilized by the first node via the 3GPP access channel; determining, by the at least one processor of the second node, whether or not a condition for performing a service evaluation is met; based on determining that the condition for performing the service evaluation is met, evaluating, by the at least one processor of the second node, a service performance of the service; determining, by the at least one processor of the second node, whether or not a condition for performing a mitigation action is met; and based on determining that the condition for performing the mitigation action is met, outputting, by the at least one processor of the second node, information for performing the mitigation action.

The method may further include: receiving, by at least one processor of a third node, the information for performing the mitigation action from the second node; determining, by the at least one processor of the third node, an unmet service performance requirement from the received information; determining, by the at least one processor of the third node, one or more mitigation actions associated with the unmet service performance requirement; and performing, by the at least one processor of the third node, the determined one or more mitigation actions.

According to embodiments, a non-transitory computer-readable recording medium having recorded thereon instructions executable by at least one processor to cause the at least one processor to perform a method including: determining, by at least one processor of a first node, whether or not multiple access points (APs) are available; based on determining that the multiple APs are available, determining, by the at least one processor of the first node, a type of each of the multiple APs; and based on the determined type of each of the multiple APs, determining, by the at least one processor of the first node, an optimal AP from among the multiple APs.

The first node may include a user equipment (UE). The type of each of the multiple APs may include: an AP associated with a 3rd Generation Partnership Project (3GPP) access channel; an AP associated with a trusted non-3GPP access channel; and an AP associated with for a untrusted non-3GPP access channel.

The non-transitory computer-readable recording medium may have recorded thereon instructions executable by at least one processor to cause the at least one processor to perform the method, in which the determining of whether or not the multiple APs are available may include scanning for APs within a coverage area.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 3 illustrates a table containing examples of user profiles, according to one or more embodiments;

FIG. 4 illustrates a table containing examples of channel quality metrics, according to one or more embodiments;

FIG. 10 is a diagram of example components of a device, according to one or more embodiments.

DETAILED DESCRIPTION

Figure 1:
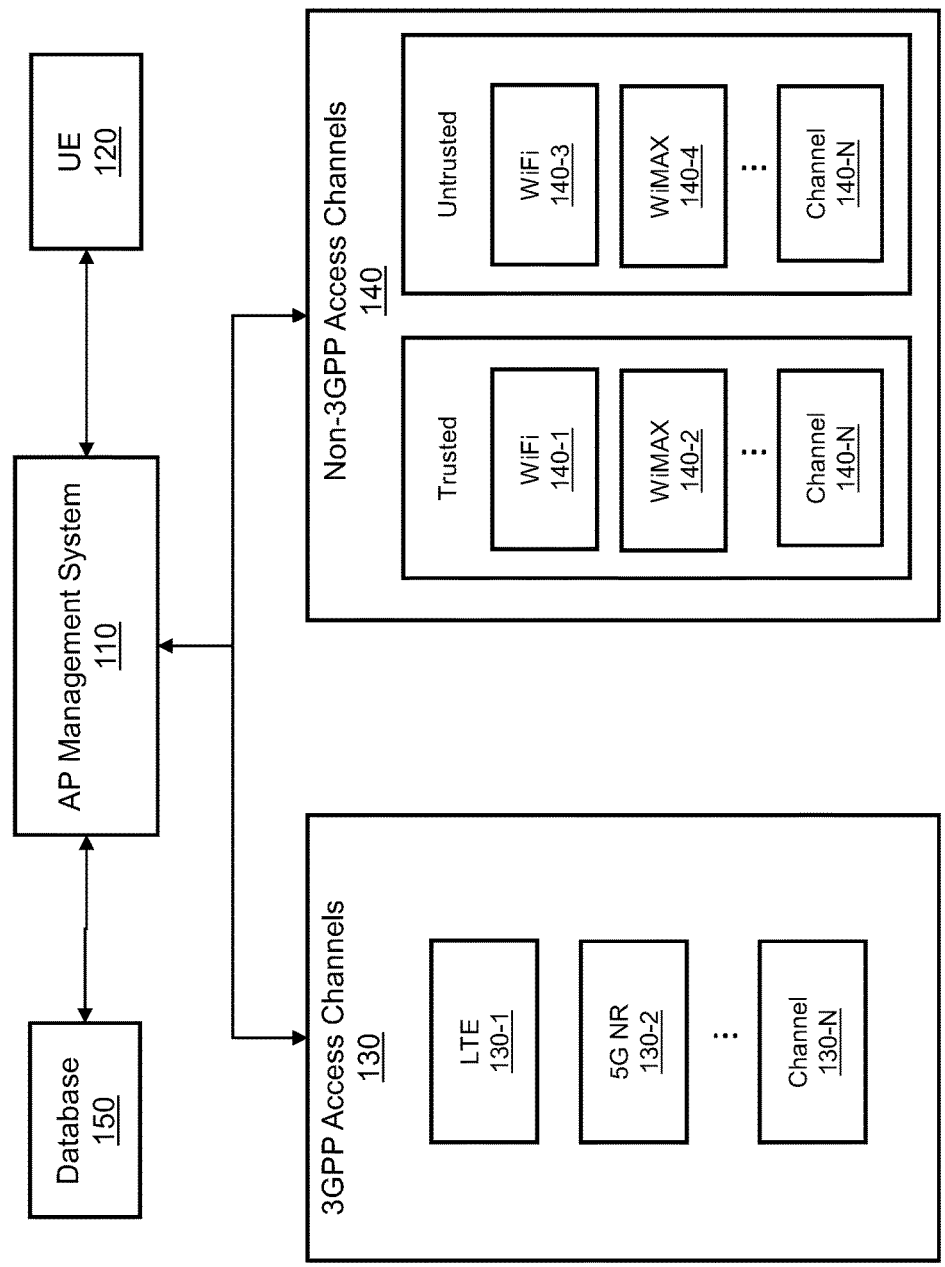
FIG. 1 illustrates a block diagram of a system for managing access points (APs) of a plurality of access channels, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

In the related art, a user equipment (UE) may have the mobility to access to one or more networks via multiple access channels. For instance, the UE may access to a network via one or more 3rd Generation Partnership Project (3GPP) access channels (e.g., Long Term Evolution (LTE), a 5th Generation New Radio (5G NR), etc.) and one or more non-3GPP access channels (e.g., a wireless fidelity (WiFi), a worldwide interoperability for microwave access (WiMAX), etc.).

The non-3GPP access channels may be further categorized into two groups: trusted non-3GPP access channels and untrusted non-3GPP access channels. A trusted access channel may refer to an access channel that is trusted by the network operator, which may include an access channel provided by the network operator or a known party (e.g., enterprise, business partner of the network operator, etc.), an access channel which have been authenticated or verified by the network operator or the UE, and the like. On the other hand, an untrusted access channel may refer to an access channel that is or has not yet been trusted by the network operator, which may include an access channel provided by an unknown party (e.g., a public access channel, etc.), an access channel which have not yet been authenticated or verified by the network operator or the UE, and the like.

Typically, an access channel may have a corresponding access point (AP) associated therewith, and the UE may access a network via a specific access channel based on the AP associated with said access channel. In the related art, there are two types of AP selection: (1) manual selection by a user, and (2) auto-selection by the UE.

Regarding approach (1), the user may need to manually configure the UE to select a desired AP. For instance, the user may need to configure an access point name (APN) (e.g., modify the existing APN, add new APN, etc.) to select the desired AP, to configure the UE to scan for available APs and select the desired AP therefrom, and the like. Nevertheless, approach (1) may require the user to have good understanding and prerequisite knowledge on the UE (e.g., how to configure the UE to scan for available APs, how to add new APN, etc.) as well as on the access channels (e.g., which channel can provide performance that best fit to the active service, which channel is secure to access, etc.). Namely, approach (1) may not be suitable for all users, since not all users have the prerequisite skills and insight to manually select an appropriate AP. Further, approach (1) may be burdensome for the user, particularly when the user's demand on the channel performance changes frequently and the user may need to frequently select different APs to cater to the new demand (e.g., they user may need to manually select an AP of a first access channel for low latency performance at a first time period and may then need to manually select another AP of a second access channel for high throughput performance at a second time period, etc.).

Regarding approach (2), the AP selection may be automatically performed by the UE based on configuration and criteria predefined by vendor of the UE and/or the network operator. For instance, the selection of the AP may be based on predefined criteria associated with access channel such as coverage level, signal strength, available bandwidth, and the like. By way of example, an AP of a non-3GPP access channel (e.g., WiFi) may be prioritized over an AP of a 3GPP access channel (e.g., LTE) due to the typically wider bandwidth of the non-3GPP access channel. Further, an AP of an untrusted non-3GPP access channel (e.g., untrusted public WiFi) may be prioritized over an AP of a trusted non-3GPP access channel (e.g., trusted shared WiFi), since the network operator and/or the vendor of the UE do not have control on or insight of the untrusted non-3GPP access channel and may simply assume that said untrusted non-3GPP access channel may provide better performance than the trusted non-3GPP access channel.

Nevertheless, the AP selected based on the above mentioned predefined configuration and criteria in the related art may not be optimal or suitable for the user, since said configuration and criteria are not predefined based on the real-time service performance requirement of the user and/or the real-time channel quality of the access channel. By way of example, the configuration and criteria may be predefined according to bandwidth availability as described above (e.g., AP with wider bandwidth will be prioritized over AP with lower bandwidth, etc.), which may not be suitable for user who would like to prioritize the latency performance. Further, since the capability of the untrusted access channel is unclear and uncontrollable, it is not possible for the network operator and/or vendor to estimate or control the performance of the untrusted access channel, thus the selection of AP of untrusted access channel may have a risk of a poor performing or low quality access channel being selected over other access channels (e.g., trusted access channels) that can provide a better performance or higher quality.

In view of the above, the selection of AP in the related art does not allow the network operator and/or service providers to provide services with guaranteed service performance and does not cater the dynamic nature of user demand on service performance, which may thereby result in user experience impairments.

Example embodiments of the present disclosures provide a system and method to automatically and dynamically determine an optimal AP based on real-time or near real-time status. Specifically, the system and method provide to a node (e.g., a UE, etc.) one or more channel quality metrics defining latest quality status of the access channel, such that the node may appropriately determine which access channel is the most optimal in view of the ongoing service and may select the AP as the optimal AP accordingly. Further, example embodiments of the present disclosures also provide a system and method to automatically and dynamically update one or more channel quality metrics, such that the one or more channel quality metrics provided to the node are always updated.

Furthermore, example embodiments of the present disclosures also provide a system and method to automatically determine and perform one or more mitigation actions to mitigate the issue(s) or error(s) inhibiting the channel performance or quality after the node is connected to the access channel via a selected AP, such that the performance of the access channel may be maintained to optimal as much as possible.

Accordingly, example embodiments of the present disclosures allow the network operator and/or service providers to provide services with guaranteed service performance and fulfill the dynamic nature of user demand on service performance, thereby improve user experiences.

FIG. 1 illustrates a block diagram of a system 100 for managing access points of a plurality of access channels, according to one or more embodiments. Referring to FIG. 1, the system 100 may include an access point (AP) management system 110, a user equipment (UE) 120, a plurality of 3GPP access channels 130, a plurality of non-3GPP access channels 140, and a database 150.

The AP management system 110 may be communicatively coupled to the UE 120, the plurality of 3GPP access channels 130, the plurality of non-3GPP access channels 140, and the database 150. Further, the AP management system 110 may be configured to obtain information or data from the database 150, to manage (e.g., based on the information obtained from the database 150) information associated with a plurality of APs each of which associated with one of the plurality of 3GPP access channels 130 or the plurality of non-3GPP access channels, and to provide the information to the UE 120 such that the UE 120 may select an AP according to the provided information. In some embodiments, the information may include one or more channel quality metrics which defines real time channel quality of one or more access channels. Further descriptions associated with the one or more channel quality metrics are provided below with reference to FIG. 4.

Further, the AP management system 110 may be hosted or deployed in a business support system (BSS), in a core network (e.g., in a component of a LTE evolved packet core (EPC), in a component of a 5G next generation core (NGC), etc.), and/or in a base station (e.g., in a component of an eNodeB, in a component of a gNodeB, etc.). In some embodiments, the AP management system 110 may comprise a service management and orchestration (SMO) module complying with requirements defined by the Open Radio Access Network (O-RAN) Alliance. Further descriptions associated with the AP management system 110 are provided below with reference to FIG. 2.

The plurality of 3GPP access channels 130 may comprise access channels complying with 3GPP standards or requirements, such as: LTE access channel 130-1, 5G NR access channel 130-2, and the like. Further, the plurality of 3GPP access channels 130 may be managed by one or more network operators. On the other hand, the plurality of non-3GPP access channels 140 may comprise access channels which do not comply with 3GPP standards or requirements. For instance, the plurality of non-3GPP access channels 140 may comprise trusted access channels such as: trusted WiFi access channel 140-1, trusted WiMAX access channel 140-2, and the like, and may comprise untrusted access channels such as: untrusted WiFi access channel 140-3, untrusted WiMAX 140-4, and the like.

The UE 120 may be communicatively coupled to the AP management system 110 and may be configured to receive information (e.g., channel quality metric(s), etc.) from the AP management system 110 and to select an AP based on the received information. Accordingly, the UE 120 may be configured to establish a connection to a network via the access channel associated with the selected AP. The UE 120 may comprise any device capable of providing one or more services to a user (e.g., an end user, a service subscriber, etc.) and/or capable of automatically selecting an AP for the user. Further, the UE 120 may have one or more software programs or applications associated with the one or more services installed or deployed thereon, or may have one or more components which allow the user to utilize the one or more services via the plurality of access channels. For instance, the UE 120 may be similar to device 1000 described below in relation to FIG. 10. Furthermore, it is contemplated that, although the UE 120 is described hereinabove as a "user equipment", it can be understood that said terms may encompass any system node or component which may automatically select an AP for the user, without departing from the scope of the present disclosure.

The database 150 may be configured to store user information such as one or more user profiles associated with one or more users. Each of the one or more user profiles may comprise subscriptions information (e.g., subscriber ID, subscription profile ID, subscription type, etc.) and service information (e.g., service metric, service type, etc.). In some embodiments, the database 150 may comprise a passive database deployed in a BSS. Further, the database 150 may be communicatively coupled to the AP management system 110, and may be configured to provide (continuously, periodically, or in response to a request) the user information to the AP management system 110. Further descriptions associated with the user information stored within database 150 are provided below with reference to FIG. 3, and further descriptions associated with the operations of the AP management system 110 (or one or more components therein) utilizes the user information are provided below with reference to FIG. 5 to FIG. 8.

It is contemplated that although only one AP management system 110, one UE 120 and one database 150 are illustrated in FIG. 1, the present disclosure should not be limited thereto and other possible embodiments should be encompassed. For instance, the embodiments of the present disclosure may also include a plurality of AP management systems 110, a plurality of UE 120, and/or a plurality of databases 150, without departing from the scope of the present disclosure.

Figure 2:
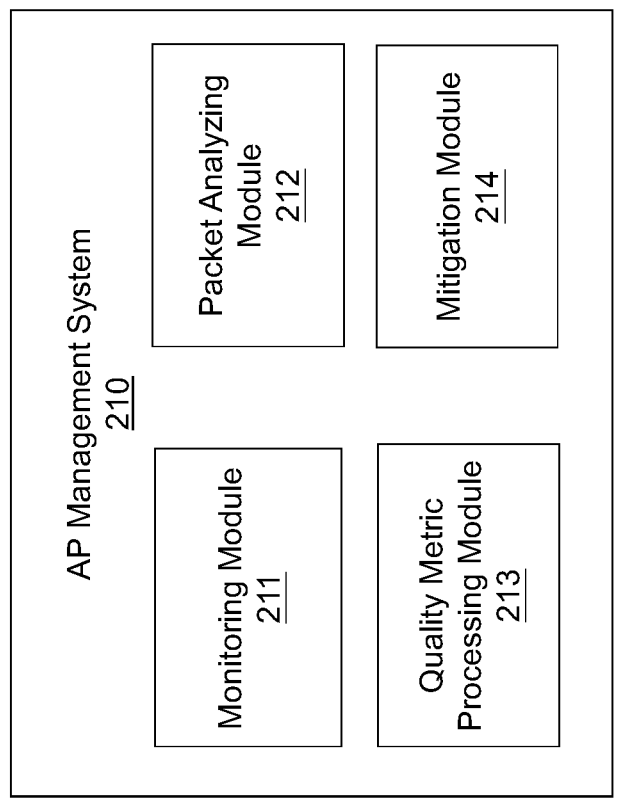
FIG. 2 illustrates a block diagram of an AP management system, according to one or more embodiments.

FIG. 2 illustrates a block diagram of an AP management system 210, according to one or more embodiments. The AP management system 210 may correspond to the AP management system 110 in FIG. 1, thus the descriptions and features described herein with reference to AP management systems 110 and 210 are similarly applicable to each other, unless being explicitly described otherwise.

Referring to FIG. 2, the AP management system 210 may comprise a monitoring module 211, a packet analyzing module 212, a quality metric processing module 213, and a mitigation module 214.

The monitoring module 211 may be communicatively coupled to a plurality of access channels (e.g., 3GPP access channels 130, non-3GPP access channels, etc.) and may be configured to continuously (or periodically) monitor and collect telemetry data from the plurality of access channels. For instance, the monitoring module 211 may be configured to collect, from the plurality of access channels, channel information or data such as: session information associated with the channel (e.g., session type(s), session active/inactive duration, etc.), cell global identity (CGI) associated with the channel (e.g., evolved CGI (ECGI), NR CGI (NCGI), etc.), activity information associated with the channel (e.g., information of service(s) or application(s) utilized via the channel, etc.), technology information associated with the channel (e.g., LTE, 5G non-standalone (NSA), 5G standalone (SA), etc.), user feedback on the channel (e.g., user's rating after utilizing the channel, etc.), quality or performance of the channel (e.g., latency, jitter, packet loss, etc.), and/or any other suitable information.

In some embodiments, the monitoring module 211 may comprise an observability framework which may be configured to provide continuous (or periodical) network observability. For instance, the observability framework may be configured to collect logs, metrics, and/or traces associated with the plurality of channels, and thereby provides comprehensive insights thereof. In this regard, the monitoring system 211 may be configured to monitor and collect, in real-time or near real-time, any suitable data or information which provides informative insights on the status, activity, and performance of the channel. Further, the monitoring module 211 may be configured to provide, in real-time or near real-time, the collected information to other modules for further processing. For instance, the monitoring module 211 may be configured to provide the collected information to the quality metric processing module 213 for further processing (to be further discussed below) and to a database (e.g., database 150 in FIG. 1) to store the collected information therein.

The packet analyzing module 212 may be communicatively coupled to one or more UE (e.g., UE 120 in FIG. 1) and may be configured to analyze data packets transmitted among the UE and a network (to which the UE is connected via the access channel). Specifically, the packet analyzing module 212 may be configured to perform operations (e.g., packet sniffing, packet inspection, etc.) to analyze and examine contents of data packets passing and exchanging between UE and the network. Further, the packet analyzing module 212 may be configured to analyze (e.g., on a per session level, etc.) information of data packets exchanging between the UE and the network. Accordingly, the packet analyzing module 212 may be configured to retract or compile information associated with one or more services utilized by the UE via the access channel, such as: type of services being utilized by user of the UE (e.g., web browsing, voice call, streaming, gaming, banking, etc.), title or descriptions of the services, statistics or usage patterns of the services, software application associated to the services (e.g., application installed on the UE or hosted online to provide the services to the user, etc.), Uniform Resource Locator (URL) associated with the services (e.g., URL specifying a location of a service content in the internet, etc.), and any other suitable information which may provide a comprehensive information and insight of one or more services utilized by the user via the UE and the access channel.

In some embodiments, the packet analyzing module 212 may comprise a deep packet inspection (DPI) engine which may be configured to perform deep packet inspection on one or more data packets passing to and from the UE via the access channel. For instance, the DPI engine may be configured to analyze contents of packet header of a data packet (e.g., contents which indicate the type of associated service) and contents of payload of the data packet (e.g., contents which indicate details of the associated service) over a given session. One or more contents of the payload may be encrypted for security or privacy reasons, and said contents may remain encrypted during the deep packet inspection process performed by the DPI engine. In this way, the DPI engine may determine and user's behavior (e.g., user's demand on service performance, etc.) on each service as per session level, while maintaining the security and privacy of the specific packet content.

Further, the packet analyzing module 212 may be configured to provide continuously or periodically, in real-time or near real-time, the analyzed information associated with one or more services to other modules for further processing. For instance, the packet analyzing module 212 may be configured to provide, in real-time or near real-time, the analyzed information to the quality metric processing module 213 for further processing (to be further discussed below) and to a database (e.g., database 150 in FIG. 1) to store said information therein.

The quality metric processing module 213 may be communicatively coupled to information or data resources (e.g., database 150, monitoring module 211, packet analyzing module 212, etc.) and may be configured to retrieve or obtain information therefrom. In some embodiments, the quality metric processing module 213 may be configured to process (e.g., create, update, etc.) one or more metrics defining the performance or quality of the access channel (referred to as "channel quality metric" hereinafter), and to continuously or periodically provide the one or more channel quality metrics to a node (e.g., a UE) such that the node may utilize said one or more channel quality metrics to select an optimal AP. Further descriptions associated with the operations of the node utilizing channel quality metric(s) in selecting the optimal AP are provided below with reference to FIG. 5, and further descriptions associated with the operations of the management of one or more channel quality metrics are provided below with references to FIG. 6.

The mitigation module 214 may comprise a mitigation engine configured to perform one or more mitigation actions to enhance performance or quality of one or more access channels (e.g., mitigate quality issues or inhibiting factors, etc.). Further descriptions associated with the operations of performing one or more mitigation actions are provided below with references to FIG. 7 to FIG. 8.

It is contemplated that the features and descriptions provided hereinabove with reference to FIG. 2 are merely an example embodiment of the present disclosure and the scope of the present disclosure should not be limited thereto. For instance, the AP management system may comprise more modules or components as discussed above, or may comprise less modules or components. Further, a plurality of the described modules may be combined as one module or may be included in one another. For instance, the monitoring module 211 and the packet analyzing module 212 may be included in one converged module, the mitigation module 214 may be part of quality metric processing module 213, and the like, without departing from the scope of the present disclosure.

FIG. 3 illustrates a table containing examples of user profiles, according to one or more embodiments. The user profiles may be computed or created during a user onboarding process or a user subscription process, and may be stored in a database (e.g., database 150 in FIG. 1, etc.).

Referring to FIG. 3, a user profile may comprise information associated with user subscription and information associated with one or more services. For instance, the user profile may comprise subscriber ID (e.g., international mobile subscriber identity (IMSI), etc.), subscription profile ID, subscription type (e.g., enterprise customer, individual customer, etc.), one or more service metrics, and service type.

The one or more service metrics may define a minimum performance requirement for a respective service (referred to as "minimum service performance requirement" hereinafter). The one or more service metrics may be predetermined by a network operator based on one or more service level agreements (SLAs) between the network operator and the users (e.g., end users, subscribers, etc.), between the network operator and the service provider, and/or between the service provider and the users.

For instance, the one or more SLAs may define the minimum service performance of a service promised or agreed by the network operator, and thus the network operator may configure the one or more service metrics according to the minimum service performance defined in the one or more SLAs so as to ensure that the minimum service performance would be delivered. Alternatively, the service metrics may also be determined by the network operator based on service requirement provided by the service provider. For instance, the service provider may provide a specification defining the preferred service requirement, and the network operator may appropriate adjust the service metrics (e.g., with reduced or increased service performance requirement) based on, for example, available network resources, insights of user's demand on the service, and the like.

Further, a user who is utilizing multiple services may have multiple users profiles each of which comprise mapping of the subscription information and the respective service information. In the example embodiment illustrated in FIG. 3, an end user with subscriber ID 1 and with subscription profile ID A may utilize two services (i.e., service 1 and application 1), and thus may have two user profiles, each of which contains a service metric defining a minimum service performance requirement (e.g., minimum guaranteed bit rate (GBR)) of the respective service.

It is contemplated that the information illustrated in FIG. 3 are merely an example embodiment of the present disclosure, and the scope of the present disclosure should not be limited thereto. Specifically, the user profile may contain additional information or less information than illustrated in FIG. 3. For instance, the user profile may contains additional service metrics, such as but are not limited to, latency, page load, throughput, jitter, packet loss, and any other suitable information for defining minimum service performance requirement, without departing from the scope of the present disclosure.

FIG. 4 illustrates a table containing examples of channel quality metrics, according to one or more embodiments. The channel quality metrics illustrated in FIG. 4 may be associated with an access channel and may be managed (e.g., created, monitored, updated, etc.) by the quality metric processing module 213 in FIG. 2.

Referring to FIG. 4, each of the channel quality metrics may comprise information such as but are not limited to: session type (e.g., voice, data, etc.) defining each session initiated by the UE to utilize the access channel, cell global identity (CGI) (e.g., evolved CGI (ECGI), NR CGI (NCGI), etc.) associated with the access channel, technology information (e.g., LTE, 5G non-standalone (NSA), 5G standalone (SA), etc.) associated with the access channel, deployment type (e.g., LTE, NSA_Sub6, NSA_mmWave, etc.) associated with the access channel, and one or more quality indicators defining the channel quality.

The one or more quality indicators may comprise: reference signal received power (RSRP) in the unit of dbm (or in any other suitable unit), reference signal received quality (RSRQ) in the unit of db (or inany other suitable unit), signal to interference plus noise ratio (SINR) in the unit of db (or inany other suitable unit), bearer ID, bearer type (e.g., GBR, non-GBR, etc.), packet loss percentage, packet delay in the unit of ms (or in any other suitable unit), jitter in the unit of ms (or in any other suitable unit), estimated perceptual mean opinion score (P-MOS) defining the service quality, throughput threshold, latency in the unit of ms (or any other suitable unit), and/or any other suitable information which may define the channel quality. For instance, the one or more quality indicators may define the performance or quality of the access channel in handling or utilizing similar service (service with similar service type, similar session type, etc.) for one or more users. In some embodiments, the one or more quality indicators of the channel quality metric may be compiled or managed based on the performance or quality of the access channel when being utilized by multiple users.

Further, the one or more quality indicators may be managed (e.g., monitored, updated, etc.) by the quality metric processing module (e.g., in real-time, near real-time, predefined interval, etc.) based on the information collected by the monitoring module and/or packet analyzing module. For instance, the quality metric processing module may be configured to continuously or periodically monitor the one or more quality indicators and to update the one or more quality indicators (e.g., adjust configuration, modify threshold, add/remove quality indicator, etc.) when required, such that the channel quality metric associated thereto would be kept updated.

It is contemplated that the information described above are merely an example embodiment of the present disclosure, and the scope of the present disclosure should not be limited thereto. For instance, the one or more channel quality metrics may comprise additional information such as user feedback on the channel (e.g., user's rating after utilizing the channel, etc.), service type, and the like. Further, the one or more channel quality metrics may compile or present information in different manner as illustrated in FIG. 4 (e.g., the one or more channel quality metrics may be categorized based on service type instead of session type, etc.).

Figure 5:
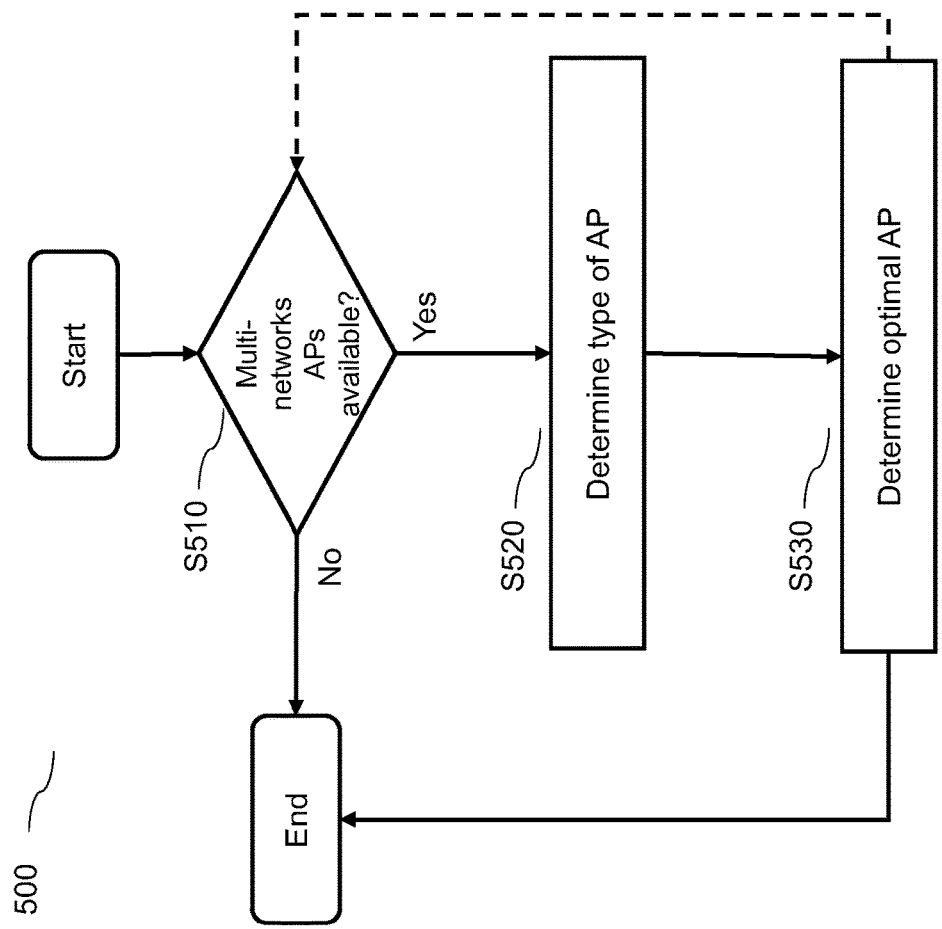
FIG. 5 illustrates a block diagram of a method for determining an optimal AP, according to one or more embodiments.

FIG. 5 illustrates a block diagram of a method 500 for determining an optimal AP, according to one or more embodiments. Method 500 may be performed by any system node or component which is capable of determining an AP for a user. For instance, method 500 may be performed by a UE (e.g., UE 120 in FIG. 1) based on one or more channel quality metrics provided by the AP management system 110 in FIG. 1. Merely for descriptive purpose, it is assumed that method 500 (and the associated methods) are performed by the UE.

In this regard, method 500 may be performed by the UE within a time period when the UE is in an idle state, such that the UE may continuously and dynamically determine the optimal AP according to real-time or near real-time service performance requirement and/or channel quality.

Referring to FIG. 5, at operation S510, the UE may determine whether or not multiple APs are available. For instance, the UE may be configured to scan (continuously or periodically) for available APs (e.g., within a coverage area, within a signal strength level, etc.), and may be configured to performed one or more operations of method 500 upon detecting multiple available APs. Accordingly, based on determining that multiple APs are available, the process proceeds to operation S520. Otherwise, the process ends.

At operation S520, the UE may determine the type of the available APs (e.g., the multiple APs detected at operation S510, etc.). For instance, the UE may be configured to determine the type of each of the available APs, such as: AP(s) of 3GPP access channel(s) (referred to as "3GPP AP" hereinafter), AP(s) of trusted non-3GPP access channel(s) (referred to as "trusted non-3GPP AP" hereinafter), and AP(s) of untrusted non-3GPP access channel(s) (referred to as "untrusted non-3GPP AP" hereinafter). The determination of the type of APs may be performed by the UE based on APN information, proxy information, port information, server information or any other suitable information, via any suitable method(s) or process(es).

At operation S530, the UE may determine an optimal AP. Specifically, the UE may be configured to determine the optimal AP according to a chronological order defined by the type of AP. In this example embodiment, the UE may be configured to determine the optimal AP from the trusted non-3GPP AP first, then determine the optimal AP from the 3GPP AP, although it is contemplated that the UE may be configured to determine the optimal AP according to any other suitable chronological order.

Specifically, in this example embodiment, for an AP which is determined as "trusted non-3GPP AP", the UE may be configured to evaluate said AP based on one or more rules or policies (e.g., intersystem routing policy (ISRP), etc.) predefined by the network operator (e.g., always select the AP whenever the signal strength exceeds a level, always select the AP when the UE is utilizing a service with a specific service type, etc.). If multiple APs are determined as "trusted non-3GPP AP", the UE may first evaluate the AP associated with an access channel that may provide better channel quality or performance. For instance, assuming that two APs are determined as "trusted non-3GPP AP", the UE may first evaluate the AP which is associated with an access channel which has stronger signal strength, wider bandwidth, and the like. Accordingly, based on determining that the condition(s) defined by the rules or polices is fulfilled, the UE may select said AP as the optimal AP. Otherwise, based on determining that the condition(s) defined by the rules and polices is not fulfilled, the UE may either evaluate the next AP determined as "trusted non-3GPP AP" (when applicable), or may be configured to evaluate AP which is determined as "3GPP AP".

In this regard, for an AP which is determined as "3GPP AP", the UE may be configured to evaluate said AP based on channel quality metric(s) associated with the AP. Specifically, the UE may retrieve (from AP management system 110, etc.) channel quality metric(s) corresponds to the service(s) utilized by the UE and retrieve (from database 150, etc.) user profile(s), and may then compare the channel quality metric(s) to the service metric(s) included in the user profile(s) to determine whether or not the access channel associated with the AP can fulfill or exceeds the minimum service performance requirement defined by the service metric(s). If multiple APs are determined as "3GPP AP", the UE may first evaluate the AP associated with an access channel that may provide better channel quality or performance. For instance, assuming that two APs are determined as "3GPP AP", the UE may determine (based on the channel quality metric(s), etc.) which AP has the best channel quality or performance (e.g., highest P-MOS, lowest latency, etc.) and may then evaluate said AP before the others.

Referring back to the evaluation of the AP based on channel quality metric(s), by way of example, assuming that the UE detects an AP of a LTE access channel and the UE is utilizing a voice service. In this regard, the UE may retrieve channel quality metric(s) associated with voice service (e.g., channel quality metric(s) which has a service session type, etc.) for said LTE access channel, and may retrieve service metric(s) which define the minimum voice quality requirement from the associated user profile(s). Subsequently, the UE may determine whether or not the channel quality metric(s) of the LTE access channel can fulfill or exceeds the minimum voice quality requirement (e.g., whether or not the LTE access channel can provide minimum bit rate that fulfill or exceed the GBR, whether or not the LTE access channel may provide data packets within packet loss percentage defined in the service metric, whether or not the P-MOS defined in the service metric(s) is greater than or equal to MOS computed based on the service metric(s), etc.).

Accordingly, based on determining that the access channel of the AP can fulfill the minimum service performance requirement defined by the service metric(s), the UE may select said AP as the optimal AP.

Otherwise, based on determining that the channel quality or performance defined by the channel quality metric(s) cannot fulfill the minimum service performance requirement defined by the service metric(s) (i.e., there is a high possibility that the access channel is unable to handle or utilize the service while providing the minimal service performance), the UE may either evaluate the next AP determined as "3GPP AP" (when applicable), or may select the "untrusted non-3GPP AP" as the optimal AP. In this regard, if multiple APs are determined as "untrusted non-3GPP AP", the UE may select the AP associated with an access channel which may provide best channel quality or performance (e.g., access channel which has the strongest signal strength, utilizes widest bandwidth, and the like).

Upon determining the optimal AP at operation S530, the process may end. Alternatively, the process may return to operation S510, such that the UE may iteratively or continuously determine an optimal AP according to the latest status (e.g., channel quality, service performance demand, etc.).

In view of the above, instead of automatically selecting an AP based on static criteria like in the related art, example embodiments of the present disclosure allow a node (e.g., a UE) to first evaluate one or more of the available APs based on real-time or near real-time information (e.g., channel quality, service requirement, etc.).

It is contemplated that the operations described above with reference to FIG. 5 are merely an example embodiment of the present disclosure, and the scope of the present disclosure should not be limited thereto. Specifically, method 500 may be performed in a different manner and/or under different condition. For instance, one or more operations of method 500 may be triggered or initiated by a predefined parameter (e.g., a flag indicating that the method 500 is enabled for the user, etc.), may be performed only to a specific user(s) (e.g., user(s) from enterprise X, user(s) with subscription plan Y, etc.), may be performed only when a specific service(s) is utilized (e.g., when the UE is utilizing application A, when the UE is performing high priority or emergency call, etc.), and the like.

Figure 6:
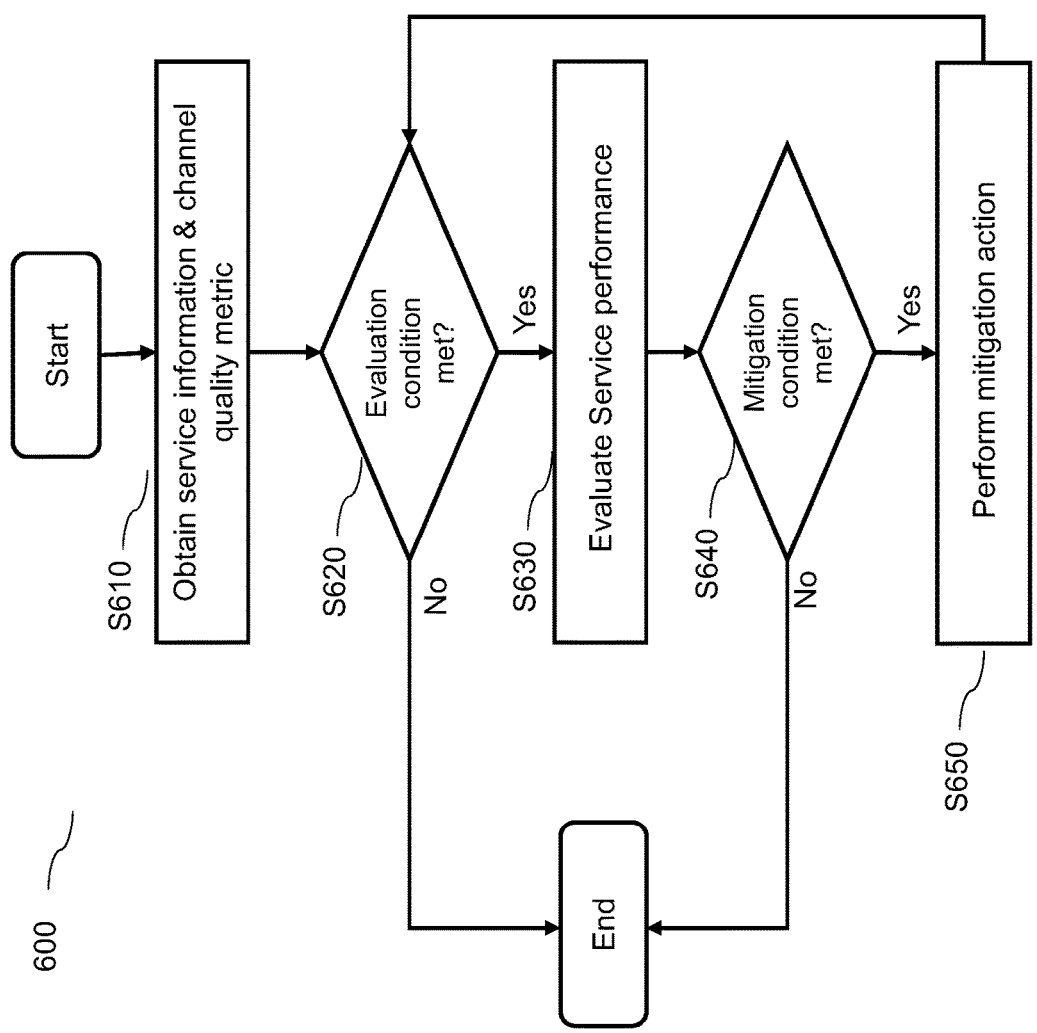
FIG. 6 illustrates a block diagram of a method for managing one or more channel quality metrics, according to one or more embodiments.

FIG. 6 illustrates a block diagram of a method 600 for managing one or more channel quality metrics, according to one or more embodiments. One or more operations of method 600 may be performed by a quality metric processing module (e.g., quality metric processing module 213, etc.) of an AP management system (e.g., AP management system 110 in FIG. 1, AP management system 210 in FIG. 2, etc.), and may be performed by a mitigation module (e.g., mitigation module 214, etc.) of the AP management system.

Specifically, one or more operations of method 600 may be performed by the quality metric processing module whenever an UE (e.g., UE 120 in FIG. 1, etc.) is connected to an access channel associated with "3GPP AP" and when one or more conditions are met, such that the actual performance of the access channel may be determined and the channel quality metric(s) associated with the access channel may be updated based on real-time or near real-time access channel performance or quality. Further, one or more operations of method 600 may be performed by the mitigation module whenever the UE is connected to the access channel and when one or more conditions are met, such that the error(s) or factor(s) inhibiting or impairing the service performance may be timely addressed to improve the channel quality, before the one or more channel quality metrics are updated.

Referring to FIG. 6, at operation S610, the quality metric processing module may obtain service information and channel quality metric. Specifically, the quality metric processing module may be configured to obtain service information (e.g., service type, service performance, etc.) from a packet analyzing module (e.g., packet analyzing module 212) in real-time or near real-time. The obtained service information may define the performance or quality of the access network (associated to the 3GPP AP to which the UE is connected) in handling or utilizing the service after the UE is connected to the access channel. Further, the quality metric processing module may be configured to obtain user profile(s) from a database (e.g., database 150) and to retrieve the associated service metric(s) from the obtained user profile(s). Furthermore, the quality metric processing module may be configured to obtain one or more channel quality metrics associated with the service from a database (e.g., database 150).

By way of example, assuming that the UE is connected to a LTE access network and has initiated a voice session via the access network to utilize a voice service. In this regard, the quality metric processing module may obtain the information of the voice service (e.g., MOS, packet loss percentage, latency, etc.) whenever the UE is connected to the LTE access network, and may obtain (from the database) the service metric(s) associated to said voice service as well as the one or more channel quality metric(s) associated to said voice service.

At operation S620, the quality metric processing module may determine whether or not a condition for performing service evaluation is met. Specifically, the quality metric processing module may be configured to compare a timer value to a predefined timer threshold value (e.g., in the unit of ms, etc.). The timer value may associate with a timer which may be triggered or initiated once the UE is connected to the access network, and the predefined timer threshold value may be preconfigured by the network operator so as to provide a predefined service evaluation cycle. The predefined timer threshold value may be preconfigured according to the service type (e.g., different service types may have different predefined timer threshold values such that different service types may have a specific evaluation cycle, etc.).

Based on determining that the timer value is less than or equal to the predefined timer threshold value, the quality metric processing module may determine that the condition for performing the service evaluation is met, and the process may proceed to operation S630.

Otherwise, based on determining that the timer value greater than the predefined timer threshold value, the quality metric processing module may determine that the condition for performing the service evaluation is not met, and the process may end. In some embodiments, before ending the process, the quality metric process module may be configured to update the one or more channel quality metrics. For instance, the quality metric process module may update one or more quality indicators of the one or more channel quality metrics based on the service metric(s), so as to reflect the latest performance or quality of the access channel in handling or utilizing the service under the same service type.

At operation S630, the quality metric processing module may evaluate service performance. Specifically, the quality metric processing module may be configured to evaluate the service performance or quality whenever the UE is connected to the access network. For instance, the quality metric processing module may compare the service information (e.g., obtained at operation S610) to the associated service metric(s) (e.g., obtained at operation S610). By way of example, assuming the service information is associated with a voice service, the quality metric processing module may be configured to compare the service information (e.g., MOS, etc.) to the minimum service performance requirement defined by the associated service metric(s) (e.g., P-MOS, etc.).

At operation S640, the quality metric processing module may determine whether or not one or more mitigation conditions are met. Specifically, the quality metric processing module may be configured to determine whether or not one or more minimum service performance requirements (e.g., defined by one or more service metric(s), etc.) are not met. Based on determining that all minimum service performance requirements (e.g., defined by all service metric (s), etc.) are met, the quality metric processing module may determine the mitigation condition is not met and the process may end. In this regard, before ending the process, the quality metric processing module may be configured to update the one or more channel quality metrics in a similar as described above in relation to operation S620.

On the other hand, based on determining that one or more minimum service performance requirements are not met, the quality metric processing module may determine whether or not a number of mitigation attempt is less than or equal to a predefined attempt threshold value. The predefined attempt threshold value may define a maximum number of allowable mitigation attempt, and may be predetermined by the network operator (e.g., based on the number of minimum service performance requirement which is not met such that the higher the number of unmet minimum service performance requirement the higher the maximum number of allowable mitigation attempt, etc.). Based on determining that the number of mitigation attempt is less than or equal to the predefined attempt threshold value, the quality metric processing module may determine that the mitigation condition is met, and the process proceeds to operation S650. Otherwise, based on determining that the number of mitigation attempt is greater than the predefined attempt threshold value, the quality metric processing module may determine that the mitigation condition is not met and the process may end. In this regard, before ending the process, the quality metric processing module may be configured to update the one or more channel quality metrics in a similar as described above in relation to operation S620.

At operation S650, one or more mitigation actions is performed. Specifically, the quality metric processing module may provide the evaluated service performance (e.g., result of operation S630) to the mitigation module 214, and the mitigation module 214 may be configured to perform one or more mitigation action accordingly. Further descriptions associated with the mitigation action are provided below with reference to FIG. 7 to FIG. 8.

After performing the mitigation action, the process may return to operation S620, so that the quality metric processing module may repeat operation S620-S640 after the mitigation action were performed. After the predefined timer threshold value is exceeded (i.e., evaluation condition is not met) or the predefined attempt threshold value is exceeded (i.e., mitigation condition is not met), the process may end. In some embodiments, before ending the process, the quality metric processing module may update the one or more channel quality metrics so as to reflect the latest channel quality or performance.

Figure 7:
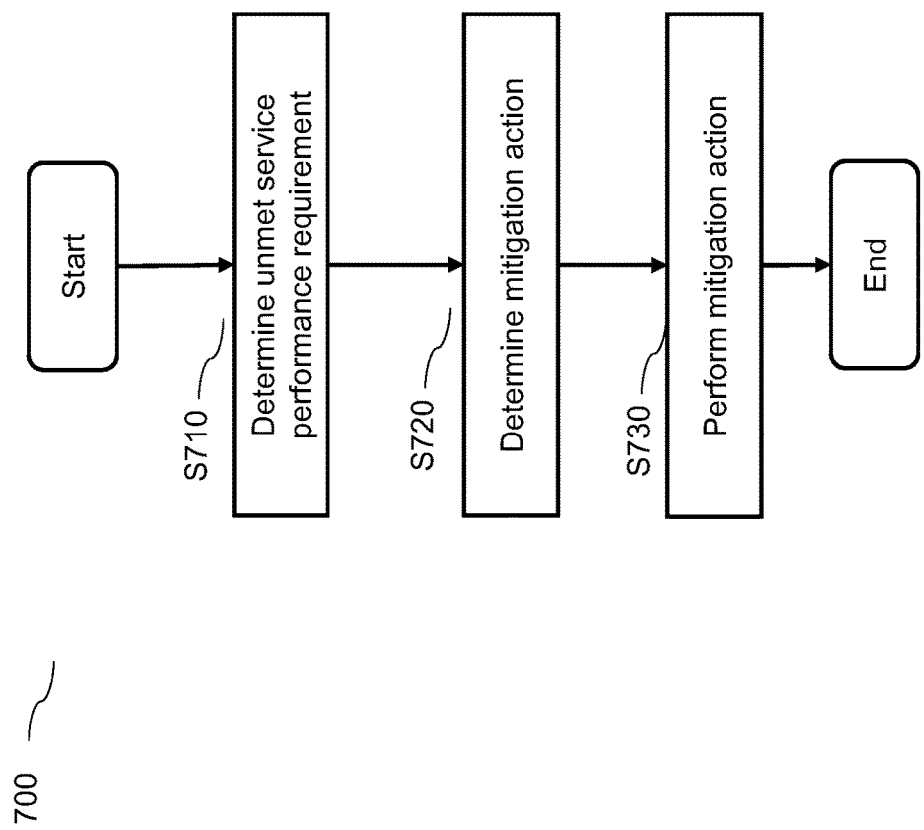
FIG. 7 illustrates a block diagram of a method for performing a mitigation action, according to one or more embodiments.

FIG. 7 illustrates a block diagram of a method 700 for performing one or more mitigation action, according to one or more embodiments. Method 700 may be part of operation S650 in FIG. 6, and may be performed by the mitigation module (e.g., mitigation module 214) of the AP management system (e.g., AP management system 210).

Referring to FIG. 7, at operation S710, the mitigation module may determine an unmet service performance requirement. Specifically, the mitigation module may be configured to receive information (e.g., evaluation result at operation S630 in FIG. 6) from the quality metric processing module, and to determine the unmet service performance requirement therefrom. In some embodiments, the mitigation module may be configured to determine information associated with the unmet service requirement (e.g., service metric(s) of unmet service requirement, service type(s) of unmet service requirement, etc.) from the received information.

At operation S720, the mitigation module may determine one or more mitigation actions. Specifically, the mitigation module may be configured to determine one or more mitigation actions for mitigating or addressing the issue(s) or factor(s) which cause the degradation of the channel quality or performance and result in the service performance requirement unmet. The one or more mitigation actions may be predefined by the network operator based on the type of unmet service performance requirement (e.g., the mitigation action(s) to be performed when minimum latency requirement is unmet may be different from the mitigation action(s) to be performed when minimum throughput requirement is unmet, etc.), and the associated information may be stored in an appropriate storage medium (e.g., a local memory included in the mitigation module, database 150, etc.).

At operation S730, the mitigation module may perform the determine mitigation action. Specifically, the mitigation module may obtain the mitigation action information (e.g., action workflow, etc.) and perform the mitigation action accordingly.

Figure 8:
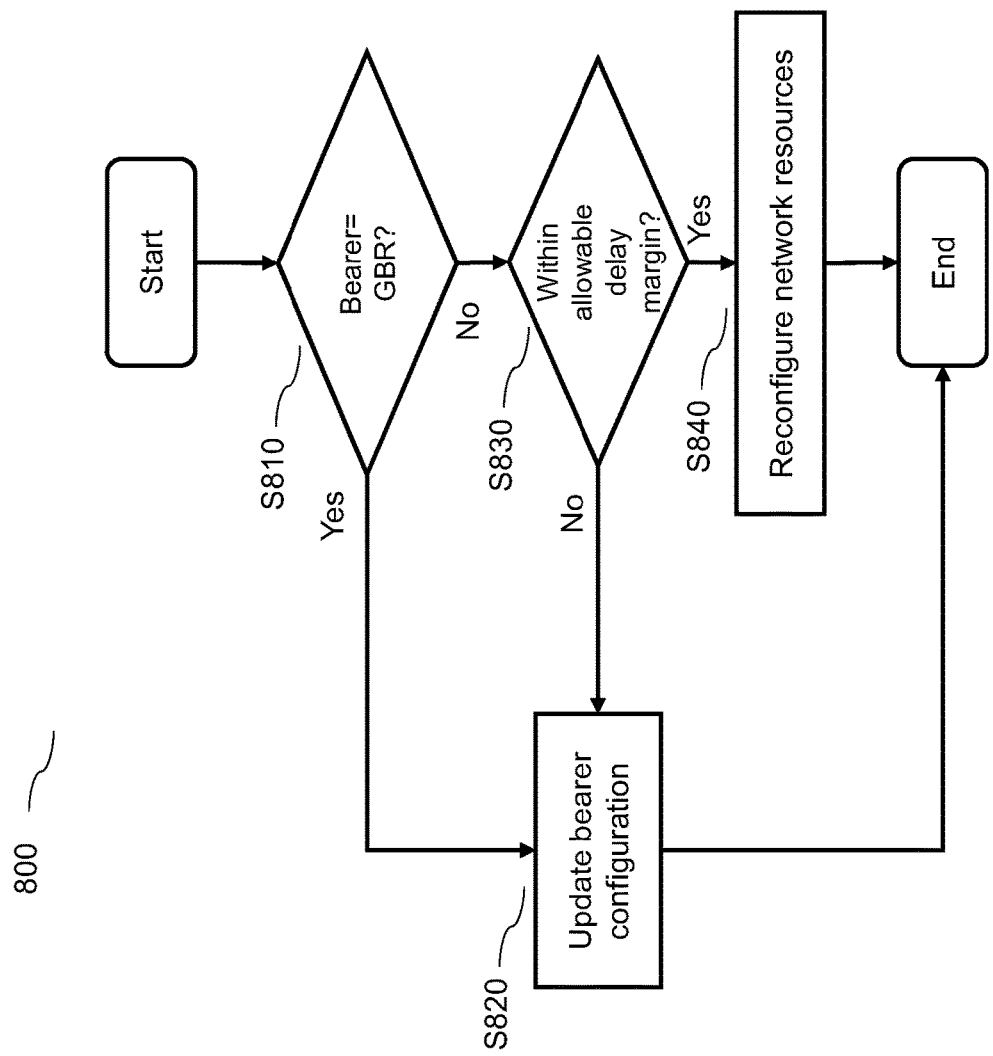
FIG. 8 illustrates a block diagram of a method for performing an example mitigation action, according to one or more embodiments.

FIG. 8 illustrates a block diagram of a method 800 for performing an example mitigation action, according to one or more embodiments. The mitigation action may be determined at operation S720 in FIG. 7 and performed at operation S730 in FIG. 7, and may be performed by the mitigation module. In the example embodiment illustrated in FIG. 8, the mitigation action may be performed when a minimum latency requirement is unmet (e.g., a MOS computed based on the latency related parameters such as packet delay may be lower than a MOS defined by the associated service metric, etc.).

Referring to FIG. 8, at operation S810, the mitigation module may determine a bearer type. Specifically, the mitigation module may be configured to determine the bearer type associated with service of which the minimum service performance requirement is unmet, based on the service information (e.g., service information pre-obtain at operation S610, etc.).

Based on determining that the bearer type is guaranteed bit rate (GBR), the process proceeds to operation S820. Otherwise, based on determining that the bearer type is not GBR (e.g., the bearer type is a non-GBR (NGBR), etc.), the process proceeds to operation S830.

At operation S820, the mitigation module may update bearer configuration. Specifically, the mitigation module may be configured to update a quality of service class identifier (QCI) of the GBR (e.g., by adjusting the policy and charging rules function (PCRF), etc.), such that a QCI which has a different priority or a packet delay budget may be assigned to the GBR. Accordingly, the scheduling and/or transmitting of the delayed data packet(s) may be prioritized and the latency performance may be improved. Subsequently, the process may end.

In some embodiments, the mitigation module may reconfigure the QCI (e.g., by adjusting the PCRF, etc.) to default configuration before ending the process. Further, after updating the bearer configuration at operation S820, the mitigation module may provide a notification (e.g., a message, a trigger, etc.) to the quality metric processing module, such that the quality metric processing module may be configured to determine the channel quality or performance after the bearer configuration is performed, and to update the channel quality metric(s) accordingly when required.

Referring back to FIG. 8, at operation S830, the mitigation module may determine whether or not an average packet delay is within an allowable delay margin. For instance, the mitigation module may determine whether or not the differences between an average queuing delay and the packet delay budget of the bearer (which define the average packet delay) is within the allowable delay margin. By way of example, assuming that the average queuing delay is 400 ms, the packet delay budget is 300 ms, and the allowable delay margin is 150 ms, the mitigation module may determine that the average packet delay is within the allowable delay margin (since the differences between the average queuing delay and the packet delay budget is 100 ms).

Based on determining that the average packet delay is not within the allowable delay margin, the process may proceed to operation S820. Otherwise, based on determining that the average packet delay is within the allowable delay margin the process may proceed to operation S840.

At operation S840, the mitigation module may reconfigure one or more network resources to reduce the latency without adjusting the bearer configuration. For instance, the mitigation module may be configured to reconfigure a Packet Data Convergence Protocol (PDCP) discard timer (i.e., a timer utilized by the PDCP layer to discard data packets that were not transmitted after a period of time), such that the scheduling or transmitting of the associated data packets may be prioritized to thereby reduce the latency. The process may end thereafter. In some embodiments, after reconfiguring the one or more network resources at operation S840, the mitigation module may provide a notification (e.g., a message, a trigger, etc.) to the quality metric processing module, such that the quality metric processing module may be configured to determine the channel quality or performance after the bearer configuration is performed, and to update the channel quality metric(s) accordingly when required.

In view of the above, example embodiments of the present disclosures provide a system and method to automatically and dynamically determine an optimal AP based on real-time or near real-time status. Specifically, the system and method provides a UE one or more channel quality metrics defining latest quality status of the access channel in handling one or more services, such that the UE may appropriately determine which access channel is the most optimal in view of the ongoing service and may select the AP as the optimal AP accordingly.

Further, example embodiments of the present disclosures also provide a system and method to automatically and dynamically update one or more channel quality metrics, such that the one or more channel quality metrics provided to the UE are always updated.

Furthermore, example embodiments of the present disclosures also provide a system and method to automatically determine and perform one or more mitigation actions to mitigate the issue(s) or error(s) identified after the UE is connected to the access channel via a selected AP, such that the performance of the access channel may be maintained to optimal as much as possible.

Ultimately, example embodiments of the present disclosures allow the network operator and/or service providers to provide services with guaranteed service performance and fulfill the dynamic nature of user demand on service performance, and thereby improve user experiences.

Figure 9:
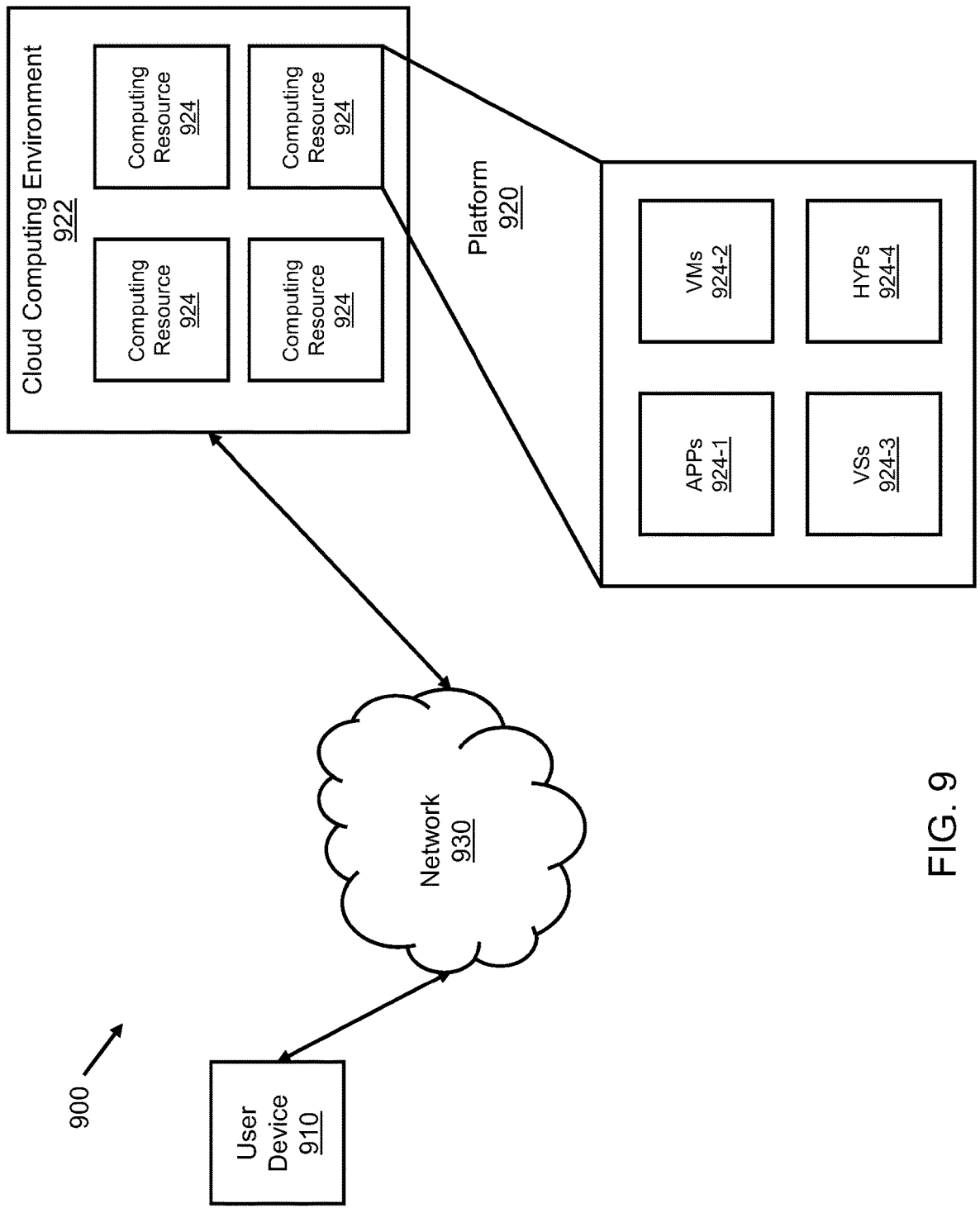
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIG. 1 through FIG. 8 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. In some implementations, user device 910 may receive information from and/or transmit information to platform 920. In some embodiments, user device 910 may corresponds to the user equipment (UE) described above in relation to FIG. 1 through FIG. 8.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses. In some embodiments, one or more of database 150, and AP management system 110/210 may be implemented in platform 920.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc. services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/ receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 800.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent: instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system comprising:
   a first node comprising:
   a memory storing instructions; and
   at least one processor configured to execute the instructions to:
   determine whether or not multiple access points (APs) are available;
   based on determining that the multiple APs are available, determine a type of each of the multiple APs; and
   based on the determined type of each of the multiple APs, determine an optimal AP from among the multiple APs by:
   evaluating, based on a predefined policy, a first AP of the multiple APs that has a determined type corresponding to an AP associated with a $3^{rd}$ Generation Partnership Project (3GPP) access channel;
   based on determining that one or more conditions defined by the predefined policy is met, determining the first AP as the optimal AP;
   based on determining that the one or more conditions defined by the predefined policy is not met, evaluating, based on a channel quality metric defining a channel quality of the 3GPP access channel and a service metric defining a minimum service performance requirement, a second AP of the multiple APs that has a determined type corresponding to an AP associated with a trusted non-3GPP access channel; and
   based on determining that the channel quality defined by the channel quality metric fulfills or exceeds the minimum service performance requirement defined by the service metric, determining the second AP as the optimal AP.

2. The system as claimed in claim 1, wherein the first node is a user equipment (UE).

3. The system as claimed in claim 1, wherein the at least one processor of the first node is configured to execute the instructions to determine whether or not the multiple APs are available by scanning for APs within a coverage area.

4. The system as claimed in claim 1, wherein the type of each of the multiple APs comprises:
   the AP associated with the 3GPP access channel;
   the AP associated with the trusted non-3GPP access channel; and
   an AP associated with a untrusted non-3GPP access channel.

5. The system as claimed in claim 4, wherein the at least one processor of the first node is configured to execute the instructions to determine the optimal AP by:
   based on determining that the channel quality defined by the channel quality metric does not fulfill the minimum service performance requirement defined by the service metric, determining a third AP of the multiple APs as the optimal AP.

6. The system as claimed in claim 5, wherein the third AP is the AP associated with the untrusted non-3GPP access channel.

7. The system as claimed in claim 4, further comprising:
   a second node comprising:
   a memory storing instructions; and
   at least one processor configured to execute the instructions to:
   based on determining that the first node is connected to the 3GPP access channel, obtain service information associated with a service utilized by the first node via the 3GPP access channel;
   determine whether or not a condition for performing a service evaluation is met;
   based on determining that the condition for performing the service evaluation is met, evaluate a service performance of the service;
   determine whether or not a condition for performing a mitigation action is met; and
   based on determining that the condition for performing the mitigation action is met, output information for performing the mitigation action.

8. The system as claimed in claim 7, further comprising:
   a third node comprising:
   a memory storing instructions; and
   at least one processor configured to execute the instructions to:
   receive the information for performing the mitigation action from the second node;
   determine an unmet service performance requirement from the received information;
   determine one or more mitigation actions associated with the unmet service performance requirement; and
   perform the determined one or more mitigation actions.

9. A method comprising:
   determining, by at least one processor of a first node, whether or not multiple access points (APs) are available;
   based on determining that the multiple APs are available, determining, by the at least one processor of the first node, a type of each of the multiple APs; and
   based on the determined type of each of the multiple APs, determining, by the at least one processor of the first node, an optimal AP from among the multiple APs by:
   evaluating, based on a predefined policy, a first AP of the multiple APs that has a determined type corresponding to an AP associated with a 3rd Generation Partnership Project (3GPP) access channel;

based on determining that one or more conditions defined by the predefined policy is met, determining the first AP as the optimal AP;

based on determining that the one or more conditions defined by the predefined policy is not met, evaluating, based on a channel quality metric defining a channel quality of the 3GPP access channel and a service metric defining a minimum service performance requirement, a second AP of the multiple APs that has a determined type corresponding to an AP associated with a trusted non-3GPP access channel; and based on determining that the channel quality defined by the channel quality metric fulfills or exceeds the minimum service performance requirement defined by the service metric, determining the second AP as the optimal AP.

10. The method as claimed in claim 9, wherein the first node is a user equipment (UE).

11. The method as claimed in claim 9, wherein the determining of whether or not the multiple APs are available comprises scanning for APs within a coverage area.

12. The method as claimed in claim 9, wherein the the type of each of the multiple APs comprises:
the AP associated with the 3GPP access channel;
the AP associated with the trusted non-3GPP access channel; and
an AP associated with for a untrusted non-3GPP access channel.

13. The method as claimed in claim 12, wherein the determining of the optimal AP comprises:
based on determining that the channel quality defined by the channel quality metric does not fulfill the minimum service performance requirement defined by the service metric, determining a third AP of the multiple APs as the optimal AP.

14. The method as claimed in claim 13, wherein the third AP is the AP associated with the untrusted non-3GPP access channel.

15. The method as claimed in claim 12, further comprising:
based on determining that the first node is connected to the 3GPP access channel, obtaining, by at least one processor of a second node, service information associated with a service utilized by the first node via the 3GPP access channel;
determining, by the at least one processor of the second node, whether or not a condition for performing a service evaluation is met;
based on determining that the condition for performing the service evaluation is met, evaluating, by the at least one processor of the second node, a service performance of the service;
determining, by the at least one processor of the second node, whether or not a condition for performing a mitigation action is met; and
based on determining that the condition for performing the mitigation action is met, outputting, by the at least one processor of the second node, information for performing the mitigation action.

16. The method as claimed in claim 15, further comprising:

receiving, by at least one processor of a third node, the information for performing the mitigation action from the second node;
determining, by the at least one processor of the third node, an unmet service performance requirement from the received information;
determining, by the at least one processor of the third node, one or more mitigation actions associated with the unmet service performance requirement; and
performing, by the at least one processor of the third node, the determined one or more mitigation actions.

17. A non-transitory computer-readable recording medium having recorded thereon instructions executable by at least one processor to cause the at least one processor to perform a method comprising:
determining, by at least one processor of a first node, whether or not multiple access points (APs) are available;
based on determining that the multiple APs are available, determining, by the at least one processor of the first node, a type of each of the multiple APs; and
based on the determined type of each of the multiple APs, determining, by the at least one processor of the first node, an optimal AP from among the multiple APs by:
evaluating, based on a predefined policy, a first AP of the multiple APs that has a determined type corresponding to an AP associated with a $3^{rd}$ Generation Partnership Project (3GPP) access channel;
based on determining that one or more conditions defined by the predefined policy is met, determining the first AP as the optimal AP;
based on determining that the one or more conditions defined by the predefined policy is not met, evaluating, based on a channel quality metric defining a channel quality of the 3GPP access channel and a service metric defining a minimum service performance requirement, a second AP of the multiple APs that has a determined type corresponding to an AP associated with a trusted non-3GPP access channel; and
based on determining that the channel quality defined by the channel quality metric fulfills or exceeds the minimum service performance requirement defined by the service metric, determining the second AP as the optimal AP.

18. The non-transitory computer-readable recording medium as claimed in claim 17, wherein the first node is a user equipment (UE).

19. The non-transitory computer-readable recording medium as claimed in claim 17, wherein the determining of whether or not the multiple APs are available comprises scanning for APs within a coverage area.

20. The non-transitory computer-readable recording medium as claimed in claim 17, wherein the type of each of the multiple APs comprises:
the AP associated with the 3GPP access channel;
the AP associated with the trusted non-3GPP access channel; and
an AP associated with a untrusted non-3GPP access channel.

* * * * *